March 5, 1940. C. A. ROBBEN ET AL 2,192,665

TURBINE PUMP BEARING

Filed April 1, 1938

INVENTORS.
C. A. Robben
M. H. Robben
BY
ATTORNEY.

Patented Mar. 5, 1940

2,192,665

UNITED STATES PATENT OFFICE 2,192,665

TURBINE PUMP BEARING

Clemens A. Robben and Matthew H. Robben, Norton, Kans.

Application April 1, 1938, Serial No. 199,380

2 Claims. (Cl. 308—238)

The present invention relates to a bearing construction and more particularly to one designed for water lubrication.

In certain types of apparatus, such as rotary water pumps, it is very difficult to insure that water does not reach the bearings. Where an oil lubricant is employed, as is the more customary practice, the water may eventually completely remove the lubricant from the bearing. Moreover, whether the oil is completely removed or not, sufficient oil is carried off to contaminate the water. While it has been proposed to form at least one bearing member of a material susceptible to lubrication by water and use the water as the lubricant for the bearing, such prior constructions have not been entirely satisfactory. In the first place, some of these bearing constructions are unduly complicated and expensive. In the second place, the element which is lubricated by the water is usually of such character and so located as to readily retain any abrasive material in the water, thus soon acquiring an abrasive surface. These and other objections have resulted in water lubricated bearings being less satisfactory in certain respects than oil lubricated bearings.

An object of the present invention is to provide a water lubricated bearing construction in which there is a sleeve of resilient material for which water is an effective lubricant surrounding and secured to a rotatable shaft and a fixed bearing member surrounding and rotatably engaging said sleeve.

A further object of the invention is to provide such a construction in which the resilient material is rubber.

A further object of the invention is to provide a bearing construction of the type set forth in the above objects in which the fixed bearing member is cylindrical and has openings therethrough, through which foreign matter in the water may be thrown by centrifugal force.

A further object is to provide a bearing construction for a relatively rotatable shaft and multi-section casing in which a bearing sleeve surrounds and is secured to the shaft and in which a fixed cylindrical bearing surrounding and in rotatable engagement with said bearing sleeve is supported by a spider, the rim of which is clamped between adjacent casing sections.

A still further object is to provide a resilient rubber bearing sleeve for a rotatable shaft, in which the internal unstressed diameter of the sleeve is less than the diameter of the shaft whereby the sleeve tightly engages the shaft.

Figure 1:
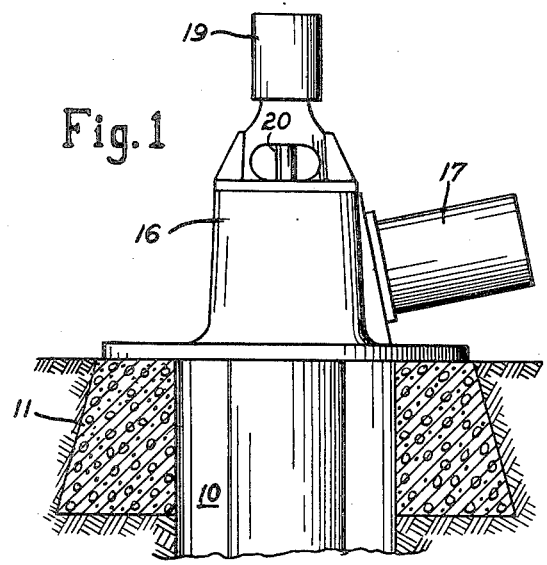
Figure 2:
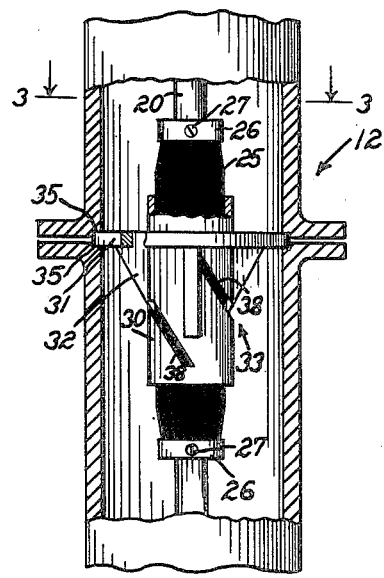
Figure 3:
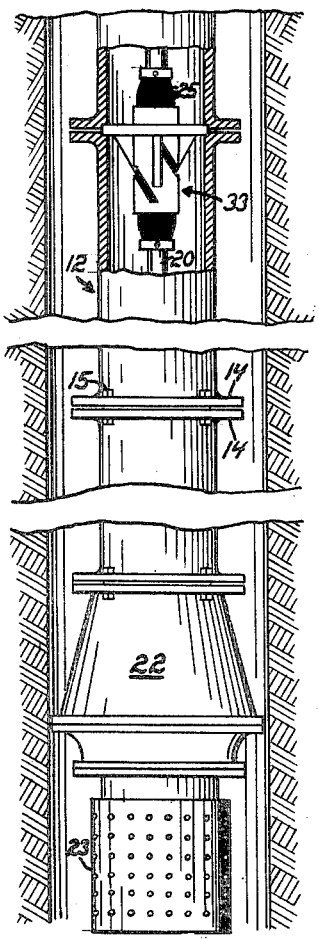
Figure 3:
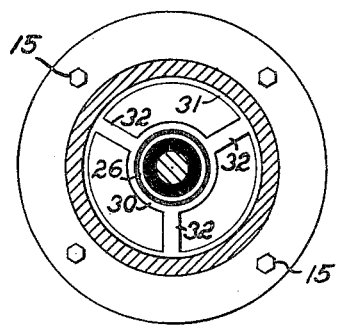

Other objects of the invention will be apparent from a consideration of the accompanying specification, claims, and drawing, in which Figure 1 is a sectional view of a well including a turbine pump embodying the improved bearing construction;

Figure 2 is an elevational view, partly in section, of the improved bearing construction, the view being on a larger scale than Figure 1; and Figure 3 is a sectional view of the bearing construction, the section being taken along the line 3—3 of Figure 2 in the direction of the arrows adjacent that line.

Inasmuch as the bearing construction of the present invention is particularly designed for use in connection with a turbine pump for a well, the bearing construction has been illustrated as applied to such a pump. Referring to Figure 1, a well is indicated by the reference numeral 10. Adjacent the top of the well is a concrete base 11. Extending through the well 10 and the base 11 is a pump casing 12 consisting of a number of sections, each provided with a flange 14 at each end thereof. The adjacent flanges are secured together by bolts 15 or other suitable fastening means in a manner more fully described later. The casing 12 is secured at its upper end to an outlet block 16 which has extending therefrom an outlet pipe 17. It is to be understood that this outlet pipe communicates with the interior of casing 12 and is adapted to be connected to other piping to convey the fluid being pumped to a desired point. At the upper end of the outlet block 16 is a pulley 19 which is connected to the pump shaft 20. This shaft 20 extends substantially the full length of the casing 12 and is connected at its lower end to a rotary impeller of conventional form housed in the enlarged portion 22 of casing 12. At the lowermost end of casing 12, a strainer 23 is secured. The pulley 19 is adapted, upon being connected to a suitable motor, to drive the shaft 20 at a high rate of speed. When the shaft is thus rotated, the impeller will raise the water through the strainer, up through the casing, and out of the outlet pipe 17. It is obviously necessary that the bearings for shaft 20 be of a type adapted to permit the shaft to revolve at a high rate of speed and that such bearings must be capable of resisting the flow of water past them. The present invention is concerned with a bearing construction suitable for this purpose.

Referring to Figures 2 and 3, a resilient rubber bearing sleeve 25 surrounds a portion of the shaft 20 adjacent a junction between two sections of casing 12. Sleeve 25 has an internal unstressed diameter slightly less than the external diameter of shaft 20. Accordingly, when the sleeve 25 is forced over the shaft, it firmly engages the shaft even when rotated at high speed. In order to check any tendency of the sleeve 25 to creep, a collar 26 is tightly secured over each end of the same. A countersunk set screw 27 extends through each of the collars 26 into threaded engagement with the shaft.

Surrounding the resilient rubber sleeve 25 is a cylindrical bearing portion 30 of a bearing member 33 of bronze or other suitable material. The cylindrical bearing portion 30 is supported by an integral spider constituted by an annular rim 31 and triangular webs 32 extending between the rim and the cylindrical portion 30. An annular recess 35 is provided in the interior of each flange 14. The rim 31 is located in the annular space formed by the annular recess 35 and is clamped in position by the bolts 15. It will be noted that the rim 31 constitutes the sealing means between sections of the casing 12. In order to insure that the joint between sections is fluid tight, a plastic cement of any suitable form is preferably applied to the rim. Upon the bolts 15 being tightened, a thoroughly tight joint is formed and, at the same time, the bearing member 33 is firmly held in place. By reason of the triangular shape of the webs 32, any angular displacement of the bearing portion 30 is prevented.

Sufficient space is provided between the rubber sleeve 25 and the cylindrical bearing 30 so that water enters the space between the two as it travels up the interior of casing 12. As is well known, water constitutes an effective lubricant for rubber and, accordingly, the water between the two bearing members thoroughly lubricates the same. Inasmuch as the rubber bearing member is the one that rotates, any abrasive matter in the water will be thrown away from the rubber by centrifugal force, such matter usually being of greater density than water. In order to expel the abrasive matter from the space within the bearing 30, diagonally extending slots 38 are provided, which slots extend entirely through the bearing 30. Due to the fact that the water is being driven upwardly and in the space between the two bearings is subjected to the rotating action of the bearing sleeve 25, the water will travel in a diagonal path in the space between the bearings. The slots 38 extend in a direction perpendicular to this diagonal path of movement of the water. By reason of this fact and by reason of the offset relation of the slots, every portion of the water going through the space between the bearings must pass under at least one of the slots, at which time the abrasive matter therein is thrown out. In this manner, it is assured that the harmful effect from the abrasive matter will be reduced to a minimum.

It will be noted that we have designed an extremely simple but effective water lubricated bearing structure wherein the effect of abrasive material in the water is minimized. It will further be noted that the relationship of the moving parts is rigidly maintained by reason of the construction of the spider supporting the fixed bearing.

While we have shown a specific embodiment of the invention, it is to be understood that this is for purposes of illustration only and that our invention is to be limited only by the scope of the appended claims.

We claim as our invention:

1. In a water lubricated bearing construction, a rotatable shaft, a sleeve of resilient material for which water is an effective lubricant surrounding and secured to said shaft, a fixed cylindrical bearing member surrounding and rotatably engaging said sleeve, said bearing being provided with parallel, staggered, diagonally extending slots through which foreign matter may be thrown by centrifugal force.

2. In combination, a casing through which water is forced, a rotatable shaft in said casing, a sleeve of resilient rubber surrounding said shaft, the unstressed internal diameter of said sleeve being slightly less than the diameter of said shaft whereby said sleeve tightly engages said shaft, a collar tightly encompassing each end of said bearing sleeve, and a bearing member comprising a spider secured within said casing and supporting a cylindrical bearing surrounding and tightly engaging said bearing sleeve, said cylindrical portion being provided with parallel, staggered, diagonally extending slots through which foreign matter may be thrown by centrifugal force.

CLEMENS A. ROBBEN.
MATTHEW H. ROBBEN.